Feb. 9, 1954    F. L. WHIPPLE    2,668,357
METER DEVICE
Filed June 29, 1951
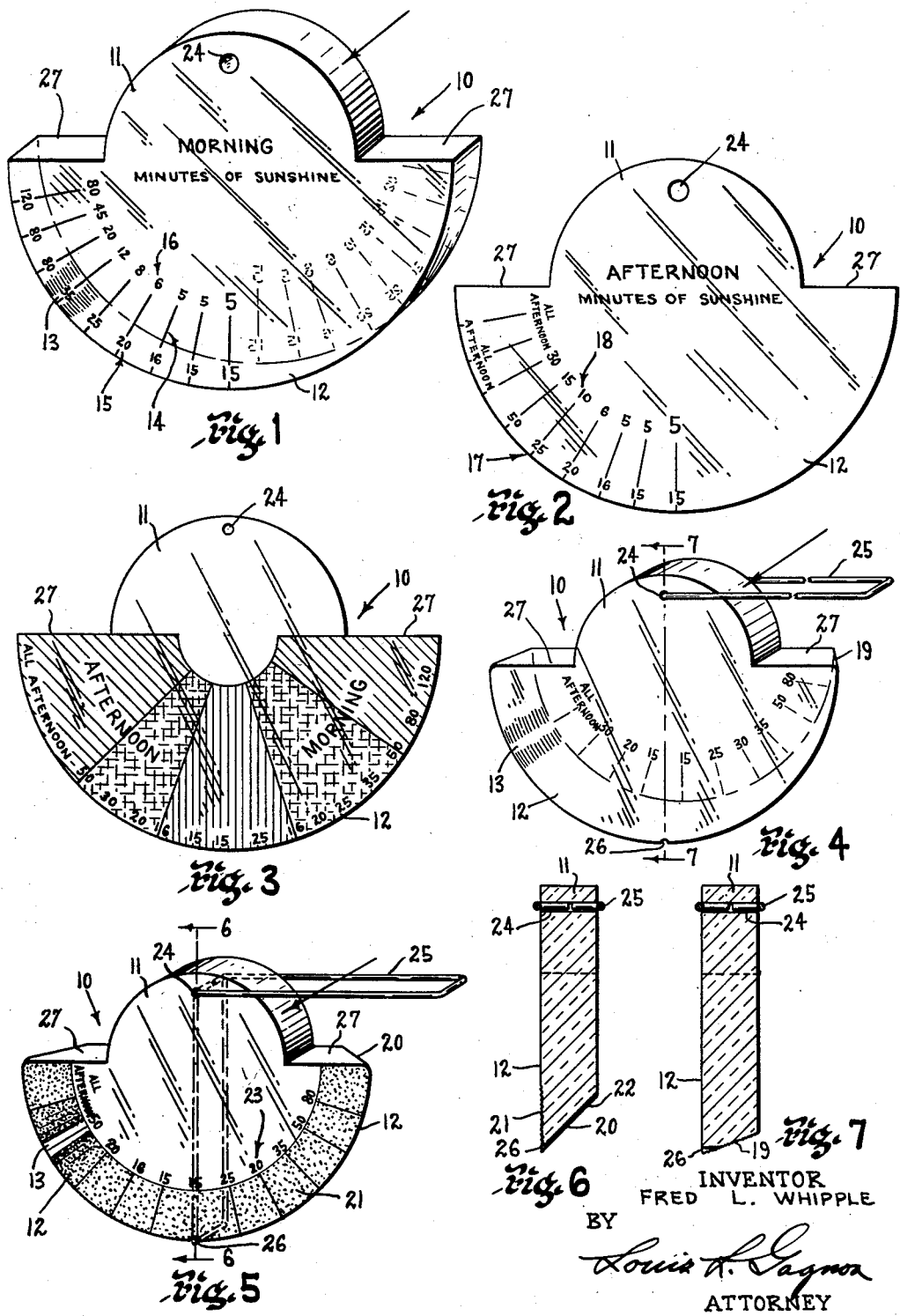
INVENTOR
FRED L. WHIPPLE
BY
Louis L. Gagnon
ATTORNEY Patented Feb. 9, 1954

2,668,357

UNITED STATES PATENT OFFICE 2,668,357

METER DEVICE

Fred L. Whipple, Belmont, Mass.

Application June 29, 1951, Serial No. 234,229

21 Claims. (Cl. 33—61)

This invention relates to meter devices of the type embodying optical means for focusing light upon an image plane at a point or line thereon in accordance with the angle of incidence of the light being focused and has for a principal object the provision of a simple instrument for indicating to an observer the amount of time succeeding the instant of observation which has, by scientific measurement and calculation, been determined as a sun exposure in moderation for the average person in latitudes and seasons for which the device is designed. By exposure in moderation is meant exposure which, for the average person, should not cause painful sunburn, technically called minimum perceptible erythema (MPE).

Construction of instruments of this invention is based upon the scientifically established fact that the major factor in erythema effect of the sun is the altitude of the sun. The influence of atmospheric conditions other than periodic or continuous solar obliteration is relatively minor.

Starting with an arbitrary unit standard of erythema effects in moderation, determined as a unit of time exposure, were the sun, fictionally, to remain fixed at the zenith, devices of this invention have provision for reading the altitude of the sun in terms of length of exposure succeeding the instant of observation which will produce that standard unit of erythema effects for various altitudes of the sun. Because the altitude of the sun is continuously changing, the length of exposure for attaining the unit of erythema effects in the forenoon, i. e., as the altitude of the sun increases, is less than it would be should the altitude of the sun remain fixed. Conversely, in the afternoon, as the altitude of the sun is decreasing, the length of exposure for attaining the unit of erythema effects is longer than it would be should the altitude of the sun remain fixed. Accordingly, a reading for a particular morning altitude will not necessarily be the same, and usually will be less, than the reading at the same altitude in the afternoon.

In the construction of devices of this invention, then, the erythema effects with continuously increasing altitudes in the forenoon and with continuously decreasing altitudes in the afternoon have been mathematically integrated, based on the rate of change of altitude for a particular latitude and season, for periods succeeding a chosen number of altitudes to give, for each altitude, a value, in terms of exposure time, corresponding to erythema effects equivalent to the unit standard. These values are recorded directly or symbolically on a scale having markings corresponding to each of such altitudes; one set of recordings or readings being applicable to morning sun, and a different set to afternoon sun.

The devices are then provided with a structure which, when the device is held or placed in the sun, will delineate by light effect that reading or symbol on the scale, morning or afternoon as the case may be, which is nearest applicable to and accurate for the altitude of the sun at the instant of observation. Such a structure may embody means for focusing the sunlight as a point, line or area of increased brightness along in the path of the image plane in response to the altitude of the sun.

Other objects and advantages of the invention will become apparent from the following description taken in connection with the accompanying drawing, in which:

Fig. 1 is a front perspective view of a preferred embodiment of the invention;

Fig. 2 is a rear elevational view of the device shown in Fig. 1;

Fig. 3 is a front elevational view illustrating a variation in the form of scale means carried by the device;

Figs. 4 and 5 are front perspective views of modified types of the device; and

Figs. 6 and 7 are vertical sectional views taken respectively on line 6—6 of Fig. 5 and line 7—7 of Fig. 4.

The device of Fig. 1 comprises a block of transparent material 10, for example a plastic, having the outward contour of two 180° segments of solid cylinders of unequal radius, co-axially joined along their flat, diametrically extending edges, the radius of the smaller cylindrical portion 11 being optically dimensioned relative to the radius of the larger cylindrical portion 12 to act as a cylindrical lens to focus light in a line extending across the bottom of the image plane which in this case is the lower peripheral edge of the device, when the block is held level and in line with the sun, at a position directly dependent upon the altitude of the sun above the horizon at the instant of observation. The proper ratio of radii is $$\frac{r_1}{r_2} = R - 1$$

where $r_1$ is the radius of the smaller portion 11, $r_2$ is the radius of the larger portion 12, and R is the index of refraction of the material of which the block 10 is composed. In Fig. 1 a line of light is indicated by the shading focused from sunlight originating in the direction of the arrow.

The focal point of the light upon the image plane which is in the form of a line of highly concentrated light is indicated in Fig. 1 by the numeral 13, this being the focal point of light being directed upon the optical element 11, as shown by the arrow, from a distant source located at a higher altitude than the device 10.

Etched or otherwise provided on the front side of the device is a scale 14 setting off appropriate intervals of a quadrant of the bottom peripheral surface. In Fig. 1 the graduations are spaced at 10° intervals. Scale 14 is provided with two sets of morning symbols indicating the time of exposure to the morning sun succeeding the instant of observation which will produce erythema effects substantially equivalent to the unit standard. In the form shown in the drawings, these symbols are numerals expressing time in minutes, but it will be understood that color or other symbols may be substituted for or added to the numerals.

As shown, the lower set 15 of the particular readings on the front of the device is based upon an arbitrary standard unit of 15 minutes exposure to the sun at the zenith and the upper set 16 of the readings is based upon an arbitrary standard unit of 5 minutes exposure to the sun at the zenith period. For example, with altitudes of 80°, 70°, 60°, 50° and 40°, the times in minutes are respectively 15, 16, 20, 25, 35, 50, 80 and 120, on the 15-minute unit scale 15; and 5, 5, 6, 8, 12, 20, 45 and 80 on the 5-minute unit scale 16. Upon using the device, a person chooses which scale is more likely to apply to him personally, scale 15 being generally applicable to the average child, adolescent and adult, and the 5-minute scale 16 being useful for babies, for persons highly susceptible to sunburn.

The afternoon scale is preferably provided on the rear surface of the device as shown in Fig. 2. Here the scales read for 80°, 70°, 60°, 50° and 40° altitudes, respectively, 15, 16, 20, 25 and 50 for the 15-minute scale 17 and 5, 5, 6, 10 and 15 for the 5-minute scale 18. On scale 17 after the sun reaches 30°, the time is unlimited for the rest of the day. The 5-minute scale 18 has an additional reading of 30 minutes for 30° and then is unlimited for the remainder of the afternoon.

In using the device, one end thereof is held toward the sun for morning reading and the other end for afternoon reading, the device being read from one side in the morning and from the other side in the afternoon. If desired, however, the scales can be duplicated in reverse so that either end may be read both morning and afternoon, or the afternoon and morning readings may be both provided on the same surface.

As mentioned above, the device can be provided with a series of variously colored areas as shown in Fig. 3 which will aid the observer in ascertaining a particular exposure time and will also provide an attractive appearance.

A modification of the device is shown in Figs. 4 and 7 wherein the rear peripheral edge of the segment 12 is beveled to provide an inclined semi-circular image plane. In this instance the graduations, for ease of manufacture of the device, are preferably placed on the rear surface of the segment 12 adjacent the beveled peripheral edge, and the beveled surface 19 is preferably ground or otherwise provided with a light diffusing surface. It will be noted here that the beveled surface 19 is angled in such a manner that the light passing through the device from the optical element 11 will strike the beveled surface 19 at an angle less than the critical angle. Thus the indicating line of light 13 will be more clearly discernible upon the diffusing surface 19 and more clearly visible from the side of the device facing said surface.

The modification illustrated in Figs. 5 and 6 comprises a device generally similar to that shown in Fig. 4, with the exception that the beveled edge 20 preferably has a polished surface so angled that the light passing through the segment 12 from the element 11 will strike the surface 20 at an angle to the normal greater than the critical angle, and the side surface area of the segment 12 adjacent its peripheral edge is provided with diffusing characteristics in the form of an arcuate band 21 whereby a line of light will be reflected from the edge 20 onto said arcuate band and will be readily visible on said side of the devise. The beveled surface 20 may, if desired, be provided with a reflecting surface coating 22 such as silvering material or the like. The said diffusing surface 21 in either case is preferably provided with the scale 23.

In order to provide a simple leveling device, the optical element 11 is provided with an opening 24 into which may be rotatably positioned a handle 25 in the form of a rod, chain, string, or other support so that when suspended by the handle 25 the device will be automatically self-levelling. To make the device more compact so that it may be easily carried in a pocket, purse or the like, and to more positively retain the device in position of use with respect to sun, the handle 25 is preferably of the type shown in Figs. 4 and 5 comprising a substantially U-shaped relatively rigid wire-like member having its ends turned inwardly of the opposed ends of the opening 24 with the loop portion thereof being of such length that it can be swung downwardly to the position shown by dotted lines in Fig. 5, with a notch 26 being provided in the lower peripheral edge of the segment 12 into which the handle can be snapped and thus retained in place when the device is not being used. The said handle, while allowing the device to level, will also hold said device against turning such as might result if suspended on a string.

It has been found that the devices described above are sufficiently accurate for use over a considerable range of latitudes and throughout the seasons, inasmuch as the only variable caused by differing latitude or season is the rate of change in the altitude of the sun, but the difference is so small that calculating for a mean latitude and for spring and fall seasons, produces results sufficiently accurate for a considerable range of latitudes and all the reasons.

It is to be understood that the scales can be built upon any reasonable standard unit desired, the calculations being the result of integration of equivalent erythema effects produced at the various altitudes represented by the scale. Thus the energy of the sun at the active ultra violet wave lengths is measured on clear days by instruments, for example, of the type described in Journal Franklin Institute, volume 23, page 699, 1937, at various altitudes of the sun. These erythemic energy values are converted to rate per minute in terms of unit rate per minute when the sun is at the zenith and are plotted as a function of the altitude of the sun. At a desired latitude and date, the altitude of the sun is obtained in terms of its hour angle from conventional available nautical tables, for example, Hydrographic Office Publications, No. 214. The converted erythemic energy values are then plotted directly as a function of the hour angle of the sun from the previous curve. To find the length of exposure at a given altitude of the sun corresponding to a desired standard unit of erythema effects when the sun is in the zenith, one integrates beneath the last-plotted curve that relates converted erythemic energy to hour angle, starting at the appropriate hour angle, until he determines the length of time thereafter such that the integral is equal to the desired standard unit of erythema effects.

The numerals shown on the scales in the drawings were taken as conservative averages from values thus derived for latitudes 30° and 40° and solar declinations at the winter solstice, the summer solstice, and the spring and fall equinoxes, utilizing as a standard unit, 5 and 15 minute values as previously described.

It is particularly pointed out that the surfaces 27 of the devices shown throughout the several views, although indicated as being in diametrically opposed aligned relation with each other, may be formed within tolerable limits to different desired surface configurations. Although they may be allowed to remain transparent in nature, it might be desirable to provide said surfaces with an opaque coating or a light diffusing surface in which instances the resultant device would be operative and possibly more efficient due to elimination of stray light which might enter the device through said surface areas.

Although the invention, as set forth in the drawings and described throughout the specification, is directed more particularly to a sunburn meter, it is pointed out that meters of a different character may be formed through the modification and suitable change of the scale means of the device whereby a sundial, photographic exposure photometer or device of a similar nature may be formed. This statement is qualified by the fact that the general construction of such devices would remain the same as that of the presently described device with the exception of the provision of a suitable scale associated with the image plane and graduated in accordance with the intended use of the device.

This application is a continuation-in-part of my forfeited copending application, Serial No. 759,639, filed July 8, 1947.

From the foregoing it will be seen that all of the objects and advantages of the invention have been accomplished. It will be apparent, however, that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. A device of the character described comprising a transparent block having the contour of two segments of solid cylinders of unequal radius coaxially joined along their flat diametrically extending edges, the radii of the two segments being dimensioned optically to focus sunlight when the device is aligned with the sun on a line extending across the peripheral edge of the larger segment at a position responsive to the altitude of the sun and a scale along the lower periphery of said block including a series of indicia indicating lengths of time of exposure to sun, commencing at different forenoon and afternoon altitudes, calculated as productive of substantially equivalent erythema, effects, whereby said focused sunlight line will visually indicate to an observer that length of time of exposure succeeding the instant of observation so calculated as productive of substantially said erythema effects.

2. A device as claimed in claim 1, wherein at least one of said segments is an 180° segment.

3. A device as claimed in claim 1, wherein both said segments are 180° segments.

4. A device as claimed in claim 3 wherein both said segments are 180° segments and the ratio of the radii is $$\frac{r_1}{r_2} = R - 1$$

where $r_1$ is the radius of the segment of smaller radius, $r_2$ is the radius of the segment of larger radius, and R is the index of refraction of the material of which the block is composed.

5. A device of the character described comprising a transparent block having the contour of two 180° segments of solid cylinders of unequal radius coaxially joined along their flat diametrically extending edges, the radii of the two segments being dimensioned optically to focus light along the peripheral edge of the larger segment when the device is held in line with the sun, a scale along the lower periphery of said device and a series of indicia applied to said scale and expressing lengths of time of exposure to sun succeeding the instant of observation calculated as productive of equivalent erythema effects for various altitudes of the sun, and means for suspending said device with a line normal to the planes of said joined edges pointing to the zenith.

6. An indicating device of the character described comprising a unitary piece of light transmitting material having one of its edge surfaces shaped to focus selected rays of light from a remote source and entering said edge surface at different given angles and having a second edge surface shaped so that said light rays entering through said first edge surface at said different angles are approximately focused and rendered visible at selected locations thereon in accordance with the angle at which they enter said first edge surface, and scale means provided along said second edge surface for indicating the location of the light rays as effected by said first edge surface.

7. An indicating device of the character described comprising a unitary block of light transmitting material having one of its edge surfaces of generally cylindrical shape to focus selected rays of light from a remote source and entering said edge surface at different given angles and having a second edge surface spaced therefrom and of a curved shape such that said light rays entering through said first edge surface at said different angles and traveling through said body portion are approximately focused and rendered visible at selected locations thereon in accordance with the angle at which they enter said first edge surface, and scale means provided along said second edge surface for indicating the location of the light rays as effected by said first edge surface.

8. A device of the character described comprising a main body of transparent material having a first curved surface thereof formed to provide a light focusing element and a second curved surface disposed adjacent the image plane of said focusing element formed by the first surface, said surfaces being of different radii of curvature with the centers thereof substantially coincident, and scale means associated with said second surface for indicating the position of the focus of light as effected by said first surface for rays entering said first surface at different given angles.

9. A device of the character described comprising a main body of transparent material having a pair of opposed cylindrical surfaces of different radii of curvature with the axes thereof coincident, and with their radii being so controlled that light rays entering one surface and traveling through said body will approximately focus on said second surface, and scale means associated with said second surface for indicating the position of the focus of light as effected by said first surface for rays entering said first surface at different given angles.

10. A device of the character described comprising a main body of transparent material having a portion thereof formed with a curved surface to provide an optical element adapted to focus light and a portion thereof formed with a curved surface at the image plane of said optical element, said curved surfaces being of different radii of curvature with the centers thereof coincident, and scale means associated with said second surface for indicating the position of the focus of light as effected by said optical element for rays entering said surface of the optical element at different give angles, and said second surface being in the form of a light diffusing surface on said main body for rendering the focus readily visible.

11. A device of the character described comprising a main body of transparent material having an edge portion thereof formed with a cylindrical optical surface and an opposing edge portion thereof formed to provide an image receiving surface curved in one meridian with its radius of curvature sufficiently greater than the radius of curvature of the optical surface and with its axis substantially coincident with the axis of said optical surface so as to be located adjacent the image plane of said optical surface, said image receiving surface in a meridian substantially normal to said first meridian being of substantially zero power and angled in said direction with respect to the plano direction of the optical surface whereby light rays directed to said image plane through said optical surface will be visible to an observer when viewed from one side of said device.

12. A device of the character described comprising a first portion of transparent material formed with a cylindrical optical surface and a second portion of said material formed with a conical surface having its curvature in planes taken through the cylindrical surface and perpendicular to the axis thereof less than the curvature of the optical surface and with its axis substantially coincident with the axis of said optical surface, the radii of curvature of said surfaces being dimensioned optically whereby light rays directed to said conical surface through said optical surface form an image thereon visible to an observer when viewed from one side of said device, and said conical surface having light diffusing characteristics sufficient to improve the viewing of said image.

13. A device of the character described comprising a main body of transparent material having a first portion formed with a cylindrical optical surface and a second portion formed with a conically curved surface having its curvature in planes taken through the cylindrical surface and perpendicular to the axis thereof less than the curvature of the optical surface and with its axis substantially coincident with the axis of said optical surface, the radii of said surfaces being dimensioned optically so that light rays directed to said conical surface through said cylindrical surface will form an image thereon visible to an observer when viewed from one side of said device.

14. A device of the character described comprising a main body of transparent material having an edge portion thereof formed with a cylindrical optical surface and an opposing edge portion thereof provided with a conical lower surface with its curvature in planes taken through the cylindrical surface and perpendicular to the axis thereof being less than the curvature of the optical surface and with its axis substantially coincident with the axis of said optical surface, the lower surface being angled in its plano direction with respect to the plano direction of the optical surface, the angle of said lower surface being other than the critical angle with respect to light rays directed thereto from said optical surface, said device further having a light diffusing surface forming an image screen for receiving said light rays as reflected from said angled surface.

15. A device of the character described comprising a body of transparent material having a first portion provided with a substantially flat frontal surface and having an arcuately shaped lower surface adjacent thereto, and a further portion provided with a cylindrical surface to form an optical element of predetermined focal length, said optical element and said arcuate lower surface of the first portion being of different curvature in planes taken through said cylindrical surface and perpendicular to the axis thereof, and having their respective centers of curvature in said planes substantially coincident, said arcuate lower surface being spaced from said cylindrical surface of the optical element and beveled at such an angle that light rays projected upon said surface by said optical element from a remote source will strike said beveled surface at an angle to the normal greater than the critical angle, said frontal surface adjacent said arcuate lower surface being provided with light diffusing characteristics and forming an image screen for receiving the rays as reflected thereupon by said lower beveled surface and presenting a visible image thereof, and scale means associated with said image screen for indicating the location of the approximate focus of said light rays as effected by said optical element for rays entering said optical element at different given angles.

16. A device of the character described comprising a body of transparent material having a first portion formed with a substantially flat frontal surface and an arcuately shaped lower surface adjacent thereto, and a second portion formed with a cylindrical surface to provide an optical element of predetermined focal length, said surface of the optical element and arcuate lower surface of the first portion being of different curvature in planes taken through said cylindrical surface and perpendicular to the axis thereof, and having their respective centers of curvature in said planes coincident, said arcuate lower surface of the first portion being located adjacent the image plane of the light rays from a remote source focused thereupon by said optical element, the rear peripheral edge of said arcuate lower surface being beveled whereby an image of said remote source will be visible to an observer through said frontal surface, and scale means associated with said surface for indicating the position of said image as effected by said optical element for rays entering said optical element at different given angles.

17. A device of the character described comprising a body of transparent material having a pair of curved surfaces of substantial power in one meridian and approximately zero power in a meridian normal thereto, said surfaces being so spaced and having their radii dimensioned optionally to provide an optical element for receiving rays of the sun impinging upon one surface thereof at any angle within a 180° arc and forming a line image of the sun on the interior side of said other surface, and scale means associated with said surface on which the image is formed for indicating the location of the image of the sun as effected by said optical element, said scale means embodying an initial indication of the image of the sun when at its zenith and a series of further indications spaced from said initial indication at predetermined intervals for indicating a predetermined effect of said rays as established by the angle of incidence of said rays upon said optional element.

18. A device of the character described comprising a body of transparent material having a pair of opposed curved surfaces of unequal radii and located in predetermined relation, the radii of the two surfaces being optically dimensioned to receive rays of the sun impinging upon the surface of shorter radius at any angle within a 180° arc and to focus said rays through the material of said body onto said surface of greater radius, and scale means associated with said last mentioned surface for indicating the position of the focus of said rays as effected by said first mentioned surface, said scale means embodying an initial indication of said position of the focus of said rays when emanating from the sun at its zenith and a series of further indications spaced from said initial indication at predetermined intervals for indicating a predetermined effect of said rays as established by the angle of incidence of said rays upon said first mentioned surface having the shorter radius, and the movement of the sun toward or away from its zenith.

19. A device of the character described comprising a body of transparent material having a pair of convex surfaces of unequal radii and located in predetermined spaced relation, the radii of the two surfaces being optionally dimensioned to receive rays of the sun impinging upon the surface of shorter radius at any angle within a 180° arc and to focus said rays through the material of said body and onto the interior side of the other convex surface, and scale means associated with said last-mentioned surface for indicating the position of the focus of said rays as effected by said first-mentioned surface, said scale means embodying an initial indication of the said location of the focus of said rays when emanating from the sun at its zenith and a series of further indications spaced from said initial indication and extending in opposite directions from either side of said initial indication and at predetermined intervals for indicating a predetermined effect of said rays as established by the angle of incidence of said rays upon said surface of shorter radius, and the movement of the sun toward or away from its zenith.

20. A device of the character described comprising a body of transparent material having a pair of opposed convexed outer edge surfaces with their radii optically dimensioned to provide an optical element for receiving rays of the sun impinging upon one edge surface thereof at any angle within a 180° arc and directing said rays through the material to render a visible image thereof on the interior side of the other surface, and scale means associated with said latter surface for indicating the image of the sun as effected by said optical element, said scale means embodying a series of indicia indicating lengths of time of exposure to sun, commencing at different forenoon and afternoon altitudes, calculated as productive of substantially equivalent erythema effects, whereby said image will indicate to an observer that length of time of exposure succeeding the instant of observation so calculated as productive of substantially said erythema effects.

21. A device of the character described comprising a main body of transparent material having a pair of opposed convexed outer edge surfaces, said surfaces being of different radii of curvature and with the centers thereof substantially coincident, their radii being optically dimensioned to form an image of sunlight when the device is aligned with the sun on the interior side of the surface of greater radius, and scale means associated with said surface for indicating the position of the focus of the sunlight as effected by said device for rays entering the surface of said device of shorter radius at different given angles and traveling through the material thereof, said scale means including a series of indicia indicating lengths of time of exposure to sun, commencing at different forenoon and afternoon altitudes, calculated as productive of substantially equivalent erythema effects, whereby said focus will indicate to an observer that length of time of exposure succeeding the instant of observation so calculated as productive of substantially said erythema effects.

FRED L. WHIPPLE.

References Cited in the file of this patent
UNITED STATES PATENTS

| Number | Name | Date |
| --- | --- | --- |
| 3,370 | Gardner | Dec. 5, 1843 |
| 1,520,790 | Wier | Dec. 30, 1924 |
| 1,674,161 | De Bogory | June 19, 1928 |
| 2,072,565 | Moehle | Mar. 2, 1937 |